US006005352A

United States Patent [19]
Odaka

[11] Patent Number: 6,005,352

[45] Date of Patent: Dec. 21, 1999

[54] ELECTRONIC FLASH DEVICE

[75] Inventor: Yukio Odaka, Kawasaki, Japan

[73] Assignee: Canon Kabushiki Kaisha, Tokyo, Japan

[21] Appl. No.: 08/991,959

[22] Filed: Dec. 17, 1997

[30] Foreign Application Priority Data

Dec. 25, 1996 [JP] Japan .................................... 8-355857

[51] Int. Cl.[6] .................................................. H04B 41/14

[52] U.S. Cl. .................................. 315/209 R; 315/241 P; 315/243; 396/159; 396/164

[58] Field of Search ............................ 315/209 R, 241 P, 315/241 S, 240, 243, 241 R, 242, 244; 396/159, 164, 205, 202

[56] References Cited

U.S. PATENT DOCUMENTS

| | | | |
|---|---|---|---|
| 4,441,774 | 4/1984 | Kazami et al. | 315/241 P |
| 4,758,937 | 7/1988 | Usui et al. | 363/19 |
| 4,847,538 | 7/1989 | Iwata et al. | 315/241 P |
| 5,309,344 | 5/1994 | Smith | 363/20 |
| 5,684,683 | 11/1997 | Divan et al. | 33/65 |
| 5,847,550 | 12/1998 | Schie et al. | 323/222 |

*Primary Examiner*—Don Wong
*Assistant Examiner*—James Clinger
*Attorney, Agent, or Firm*—Robin, Blecker & Daley

[57] ABSTRACT

An electronic flash device includes a first DC—DC converter circuit of separately-excited type, a second DC—DC converter circuit of separately-excited type, a capacitor to be charged by the first DC—DC converter circuit and the second DC—DC converter circuit, and a discharge tube which converts charging energy charged to the capacitor into light energy. The first DC—DC converter circuit includes a first switching element having a first control electrode, and an a first oscillation transformer to which energization is controlled by the first switching element. A first control pulse signal is supplied to the first control electrode. The second DC—DC converter circuit includes a second switching element having a second control electrode, and an a second oscillation transformer to which energization is controlled by the second switching element. A second control pulse signal is supplied to the second control electrode. The first DC—DC converter circuit and the second DC—DC converter circuit are connected in parallel, and the first and second control pulses are supplied such that the second control electrode changes from a non-energizing state to an energizing state before the first control electrode changes from an energizing state to a non-energizing state.

18 Claims, 4 Drawing Sheets

ELECTRONIC FLASH DEVICE

BACKGROUND OF THE INVENTION

1. Field of the Invention

The present invention relates to a charging circuit for an electronic flash device.

2. Description of Related Art

Known methods for rapidly charging electronic flash devices include a method of increasing the turn ratio between the primary winding and the secondary winding of an oscillation transformer and detecting the voltage of a main capacitor so as to stop the charging voltage at a predetermined voltage at which the electronic flash device becomes usable, and a method of switching the turn ratio between the primary winding and the secondary winding of an oscillation transformer on the way during charging. Another method which has been used for rapid charging involves charging with a push-pull converter (hereinafter referred to as "P—P converter").

FIG. 4 illustrates a known P—P type DC—DC (direct-current-to-direct-current) converter circuit. Reference numeral 1 denotes a battery which is the electrical power source, reference numeral 2 denotes a resistor, reference numeral 3 denotes a capacitor, reference numeral 4 denotes a first oscillation transistor, reference numeral 5 denotes a first switching element, and reference numeral 6 denotes a diode. A parallel circuit composed of the resistor 2 and the capacitor 3 is connected between the base of the first oscillation transistor 4 and the emitter thereof, and the base of the first oscillation transistor 4 is connected to the cathode of the diode 6 via the first switching element 5, and the anode of the diode 6 is connected to the negative pole of the battery 1.

Reference numeral 7 denotes a resistor, reference numeral 8 denotes a capacitor, reference numeral 9 denotes a second oscillation transistor, reference numeral 10 denotes a second switching element, and reference numeral 11 denotes a diode. A parallel circuit composed of the resistor 7 and the capacitor 8 is connected between the base of the second oscillation transistor 9 and the emitter thereof, and the base of the oscillation transistor 9 is connected to the cathode of the diode 11 via the second switching element 10, and the anode of the diode 11 is connected to the negative pole of the battery 1.

Reference numerals 13 and 14 denote resistors. Reference numeral 15 denotes an oscillation transformer, having a first primary winding $P_1$, a second primary winding $P_2$, a secondary winding S and a feedback winding F. The junction point of the first and second primary windings $P_1$ and $P_2$ is connected to the negative pole of the battery 1, and the other ends of the first and second primary windings $P_1$ and $P_2$ are connected to the collector of the first oscillation transistor 4 and the collector of the second oscillation transistor 9, respectively.

Both ends of the secondary winding S are connected to each other via the diodes 18 and 19. The feedback winding F is connected between the cathodes of the diodes 6 and 11 according to the polarity indicated in FIG. 4, and the resistors 14 and 13 are connected to the diodes 6 and 11 in a parallel manner. The junction point of the cathodes of the diodes 18 and 19 is connected to the positive pole of a main capacitor 23.

Reference numeral 16 and 17 denote diodes, which are inserted between the cathode of the diode 11 and the anode of the diode 18 and between the cathode of the diode 6 and the anode of the diode 19, respectively. Reference numeral 20 denotes a voltage detecting circuit, which is connected to the main capacitor 23 in a parallel manner. Reference numeral 21 denotes a trigger circuit for triggering emission of light, and reference numeral 22 denotes a discharge tube. Reference characters "a", "b" and "c" denote terminals, which are connected to a camera control circuit (not shown).

Now, description of the DC—DC converter circuit will be made. When a charging signal for the electronic flash device is supplied from the camera control circuit (not shown), a voltage of a high level is generated at the terminal "a". Accordingly, the level of each of the resistor 12, the control electrode of the first switching element 5 and the control electrode of the second switching element 10 becomes high, so that the first and second switching elements 5 and 10 both are brought into a conducting state. Since the structures of the primary-side oscillation circuits respectively composed of the first oscillation transistor 4 and the second oscillation transistor 9 are the same, the start of oscillation is effected contingently to the balance of the various elements. Here, description will be made under the presupposition that the first oscillation transistor 4 is the first to start oscillation.

Once the switching elements 5 and 10 are brought into a conducting state, a base current flows from the battery 1 via the emitter and base of the first oscillation transistor 4, the first switching element 5 and the resistor 14. Due to the base current, a collector current of $h_{FE}$ times the base current flows to the first primary winding $P_1$ of the oscillation transformer 15. The collector current causes an electromotive force to be generated in the secondary winding S and the feedback winding F.

Due to the electromotive force generated in the secondary winding S, a current flows through the diode 18, the main capacitor 23, the battery 1, the emitter and base of the first oscillation transistor 4, the first switching element 5 and the diode 17, and due to the electromotive force generated in the feedback winding F, a current flows through the resistor 13, the battery 1, the emitter and base of the first oscillation transistor 4 and the first switching element 5, so that with each current flowing as the base current of the first oscillation transistor 4, the first oscillation transistor 4 instantly comes into a saturated state.

When the current flows to the first primary winding $P_1$ and the magnetic flux of the core thereof becomes saturated, a reverse electromotive force is generated in each of the windings, so that a reverse bias is applied between the base and emitter of the first oscillation transistor 4, and a current flows to the feedback winding F via the resistor 14, battery 1, the emitter and base of the second oscillation transistor 9 and the second switching element 10. Also, when the current flows to the second primary winding $P_2$, a current flows through the diode 19, the main capacitor 23, the battery 1, the emitter and base of the second oscillation transistor 9, the second switching element 10 and the diode 16, so that with each current becoming the base current of the second oscillation transistor 9, the collector current of the second oscillation transistor 9 flows to the second primary winding $P_2$. This electromotive force causes the electromotive force generated in the secondary winding S and the feedback winding F to be generated at the polarity at which the electromotive force increases as a base current, and thus the second oscillation transistor 9 instantly comes into a saturated state.

In such a way as described above, the first and second oscillation transistors 4 and 9 are instantly switched, and alternately are placed in conducting states and non-conducting states, thereby performing DC—DC converting operations. This voltage step-up operation causes a high-voltage charging charge to be stored in the main capacitor 23. Then, the potential of the main capacitor 23 increases, and a charge completion signal is generated at the point of time at which the voltage detecting circuit 20 judges the voltage to be a certain voltage, e.g., 330V. The charge completion signal is supplied via the connection terminal "b" to the camera control circuit (not shown). The camera control circuit changes the level of the connection terminal "a" from a high level to a low level so as to place the switching elements 5 and 10 in a non-conducting state, and stops the oscillation of the oscillating transistors 4 and 9 by means of stopping the base current thereof, so that charging to the main capacitor 23 is stopped. Subsequently, at the point of time at which a flash emission signal for the electronic flash device is supplied to the trigger circuit 21 from the camera control circuit via the terminal "c" in accordance with a photo-taking operation, a high-voltage pulse of several kV is applied to the trigger electrode 22*a* of the discharge tube 22 from the trigger circuit 21. Then, the discharge tube 22 is excited by this high-voltage pulse, and the charged charge of the main capacitor 23 is discharged so as to cause the discharge tube 22 to emit flash light, thus illuminating an object to be photographed.

According to such a known example, in the event that a known single oscillation circuit is used, there is approximately 10 μsec of time until the magnetic saturation of the oscillation transformer is cleared, and although the duty ratio between the conducting state and non-conducting state differs between at the time of start of oscillation and at the time of completion of charging, that duty ratio taken as an overall average is around 70% in general electronic flash devices built in cameras. Accordingly, with the P—P converter shown in the known example in FIG. 4, that duty ratio can be made greater by instantly inverting the operation of the oscillation transformer, thus allowing for charging of the main capacitor 23 to be perpetually conducted, thereby facilitating speedy charging.

However, although the duty ratio of the known example is increased, switching time of 3 μsec to 5 μsec is required for switching of the oscillation transistors 4 and 9, so that the duty ratio is around 85%, meaning that the duty ratio could not be made to unlimitedly approach 100%.

BRIEF SUMMARY OF THE INVENTION

In accordance with one aspect of the invention, there is provided an electronic flash device comprising a plurality of DC—DC (direct-current-to-direct-current) converter circuits of separately-excited type each of which is provided with an oscillation transformer, energization to the oscillation transformer being controlled by a switching element having a control electrode, and a control pulse signal being supplied to the control electrode, wherein the plurality of DC—DC converter circuits are connected in parallel, and, when the switching elements included in the parallel-connected DC—DC converter circuits are switched between a conducting state and a non-conducting state, there is set a section of time at which the conducting states of the respective switching elements overlap with each other, so that the duty ratio can be made to approach 100%.

Other aspect and features of the invention will be apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

Figure 1:
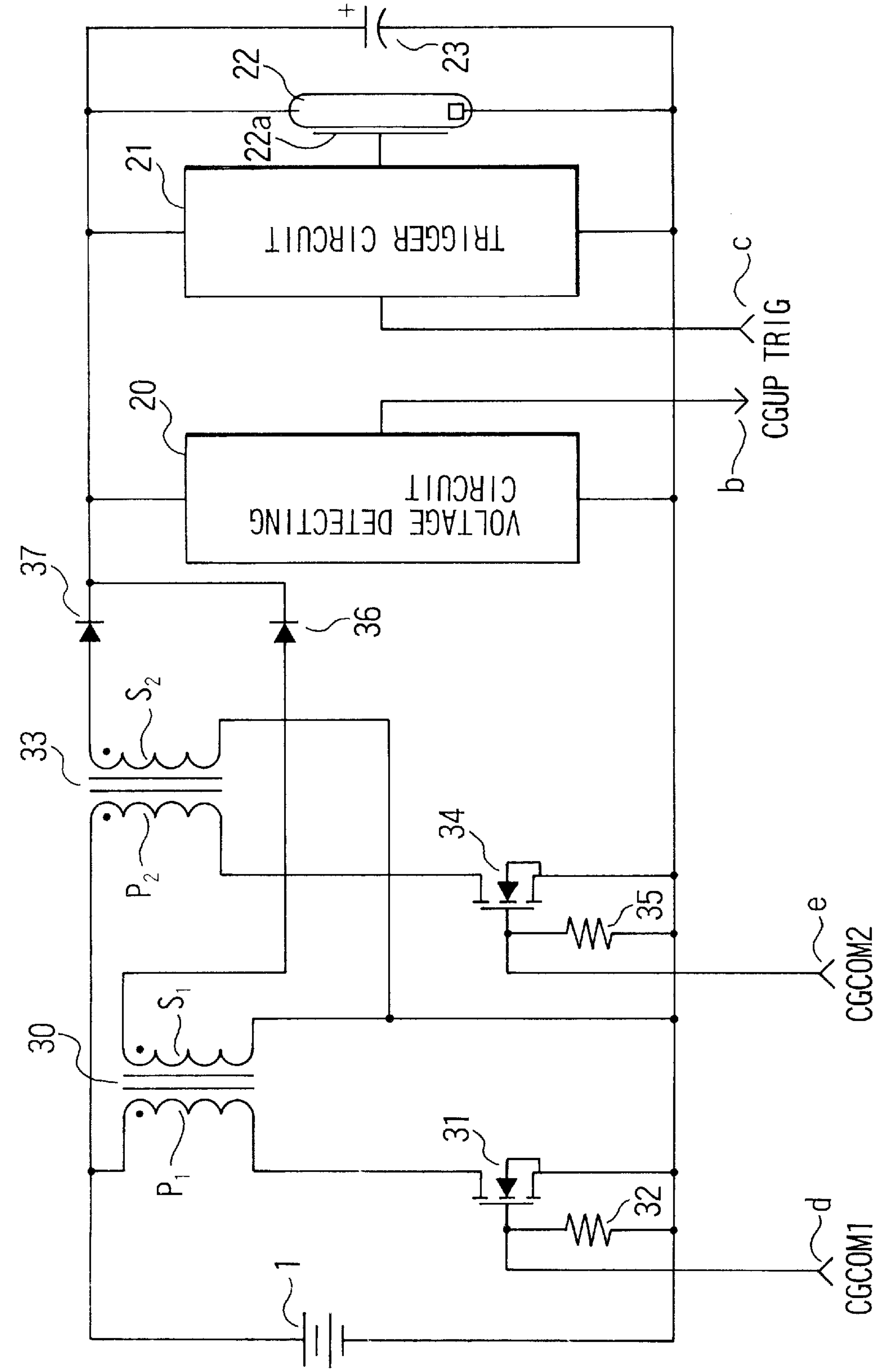
FIG. 1 is circuit block diagram illustrating a first embodiment of the invention.
Figure 4:
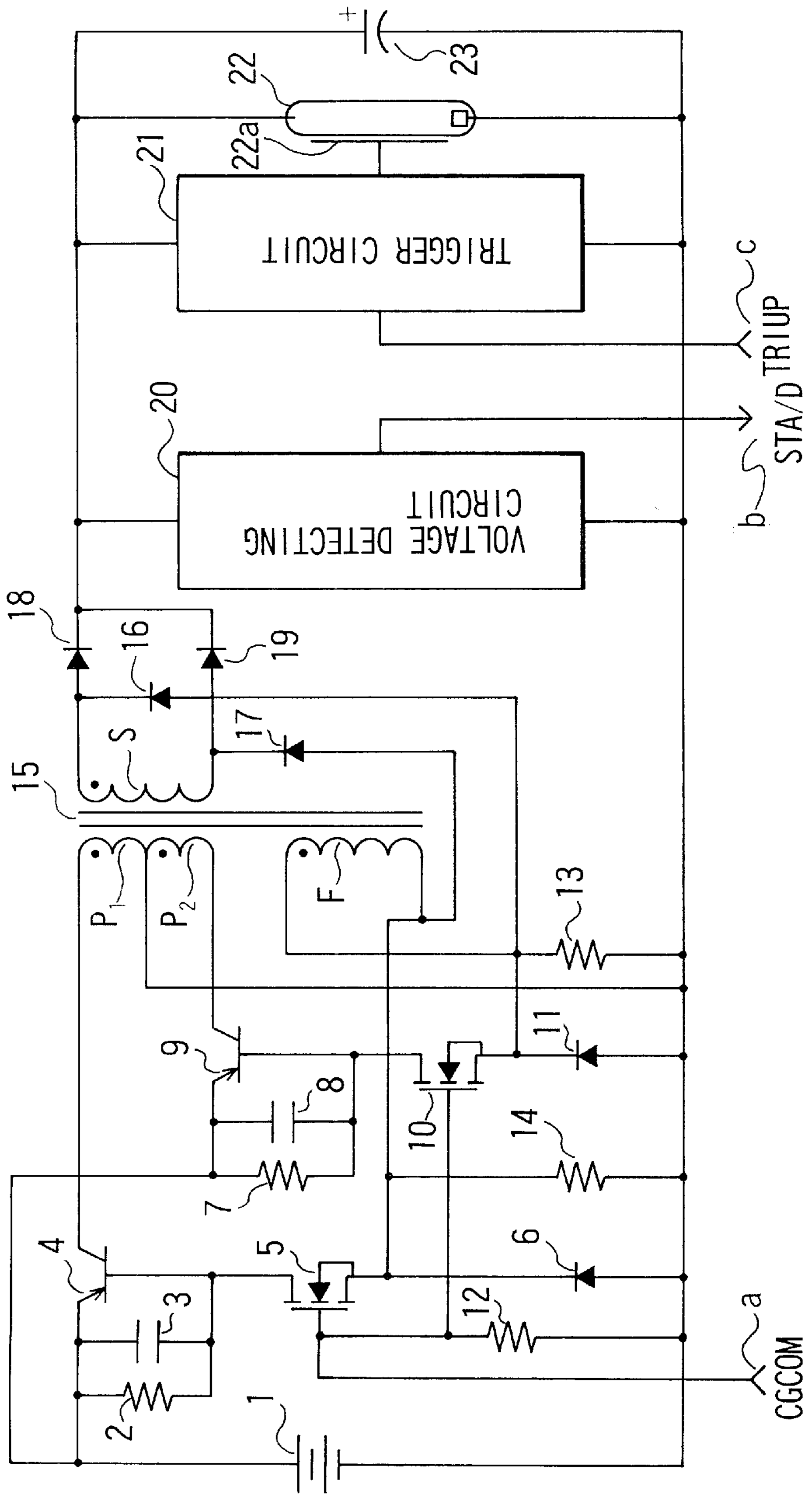
FIG. 4 is circuit block diagram illustrating a known example.

FIG. 1 is a circuit diagram illustrating a first embodiment of the invention. In FIG. 1, elements having equivalent functions to the elements shown in FIG. 4 are denoted by the same reference numerals.

Reference numeral 1 denotes a battery which serves as a power source, reference numeral 30 denotes a first oscillation transformer, and reference numeral 31 denotes a first step-up switching element which has a control electrode. Reference numeral 32 denotes a resistor. A primary winding $P_1$ of the oscillation transformer 30 and the first step-up switching element 31 are connected in series to each other, and are connected in parallel with the battery 1. The resistor 32 is connected between the control electrode of the first step-up switching element 31 and the negative pole of the battery 1, for the purpose of preventing inadvertent operation of the first step-up switching element 31 when no signals are received. Reference numeral 33 denotes a second oscillation transformer, and reference numeral 34 denotes a second step-up switching element which has a control electrode. Reference numeral 35 denotes a resistor. A primary winding $P_2$ of the second oscillation transformer 33 and the second step-up switching element 34 are connected in series to each other, and are connected in parallel with the battery 1. Also, the oscillation transformers 30 and 33 are transformers of the same form.

The resistor 35 is connected between the control electrode of the second step-up switching element 34 and the negative pole of the battery 1, for the purpose of preventing inadvertent operation of the second step-up switching element 34 when no signals are received. Reference numerals 36 and 37 denote high-voltage rectifying diodes, which are connected so as to rectify the outputs of secondary windings $S_1$ and $S_2$ of the respective oscillation transformers 30 and 33. Reference numeral 20 denotes a voltage detecting circuit, reference numeral 21 denotes a trigger circuit for triggering emission of flash light, and reference numeral 22 denotes a discharge tube. Reference numeral 23 denotes a main capacitor, to which each of the voltage detecting circuit 20, the trigger circuit 21 and the discharge tube 22 is connected in parallel. Reference characters "d", "e", "b" and "c" denote connection terminals, which are connected to a camera control circuit (not shown). Description of the operation will be made according to the above configuration.

Figure 2:
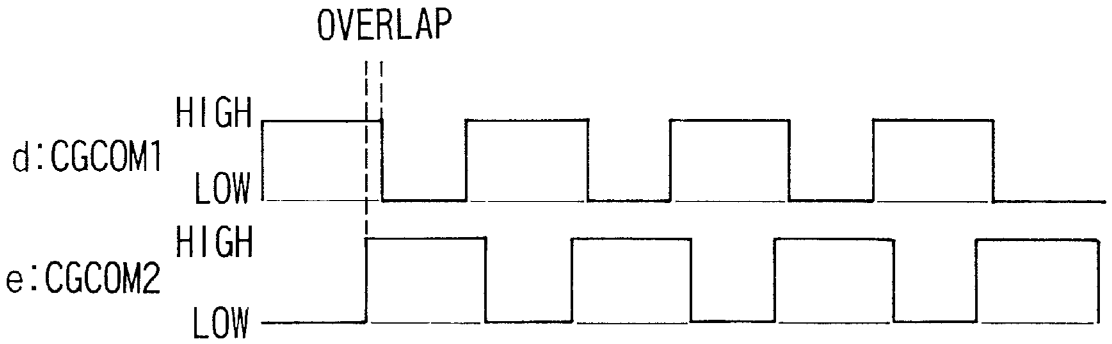
FIG. 2 is a diagram illustrating control pulse signals for describing the operation of the first embodiment of the invention.

A charge which is to be charged to the main capacitor 23 flows through the rectifying diode 36 or 37 by means of the output of the oscillation transformer 30 or 33. The element for controlling the oscillation output of the oscillation transformer 30 or 33 is the step-up switching element 31 or 34, which has the control electrode. Here, control signals CGCOM1 and CGCOM2 shown in FIG. 2 are provided to the control electrodes of the step-up devices 31 and 34, respectively. The control signal CGCOM1 is supplied to the terminal "d" via the camera control circuit (not shown), and the control signal CGCOM2 is supplied to the terminal "e"

the camera control circuit (not shown). As shown in FIG. 2, the control signals CGCOM1 and CGCOM2 are output in such a manner that high-level periods of the control signals CGCOM1 and CGCOM2 overlap with each other in part. Further, the pulse width of the high-level pulse is preferably set such that a current flowing to the primary winding side of the oscillation transformer 30 or 33 due to high-level signals being provided and the step-up switching element 31 or 34 in a conducting state does not cause magnetic flux saturation of the oscillation transformer 30 or 33, i.e., such that magnetic flux saturation of the core of the oscillation transformer 30 or 33 does not occur at the point of completion of charging of the main capacitor 23. Also, the pulse width of the low-level pulse is preferably of a duration required for the magnetic flux at the core which is saturated to be resolved.

Now, when the control signal CGCOM1 shown in FIG. 2 is supplied to the control electrode of the step-up switching element 31 via the terminal "d" from the camera control circuit (not shown), the step-up switching element 31 becomes conductive (comes into a conducting state), and a current flows from the battery 1 which serves as the power source via the primary winding $P_1$ of the oscillation transformer 30. Due to this current, an electromotive force is generated in the secondary winding $S_1$ of the oscillation transformer 30, and this electromotive force causes a current to flow through the loop of the high-voltage rectifying diode 36, the main capacitor 23 and the secondary winding $S_1$ of the oscillation transformer 30, thus charging the main capacitor 23. The pulse width of the control signal CGCOM1 is set, as described above, such that the control signal CGCOM1 changes to a low level before the magnetic flux of the core of the oscillation transformer 30 is saturated, and when the core magnetic flux is saturated, an excessive current does not flow to the step-up switching element 31.

Before the step-up switching element 31 becomes non-conductive (comes into a non-conducting state), the control signal CGCOM2 shown in FIG. 2 is supplied to the connection terminal "e" in such a manner that the high-level period thereof overlaps with the high-level period of the control signal CGCOM1 in part. When the high-level pulse of the control signal CGCOM2 is provided to the control electrode of the step-up switching element 34, the switching element 34 becomes conductive. Due to the step-up switching element 34 becoming conductive, a current flows from the battery 1 serving as the electrical power source via the primary winding $P_2$ of the oscillation transformer 33, so that an electromotive force is generated in the secondary winding $S_2$ of the oscillation transformer 33. This electromotive force causes a current to flow through the loop of the high-voltage rectifying diode 37, the main capacitor 23 and the secondary winding $S_2$ of the oscillation transformer 33, thus charging the main capacitor 23 as well.

While the low-level signal is being supplied to the control electrode of the step-up switching element 31 via the connection terminal "d", a reverse electromotive force due to the current flowing to the primary winding $P_1$ of the oscillation transformer 30 being suddenly cut off is restored. The time width during which the low-level signal is being supplied is set, as described above, so as to be approximately the same as the time required for the reverse electromotive force generated by core magnetic flux saturation to recover. Also, since the oscillation transformers 30 and 33 used here are of the same form, the time width of the high-level pulse or low-level pulse of the control signal CGCOM1 is the same as that of the control signal CGCOM2 as shown in FIG. 2.

As described above, the step-up switching elements 31 and 34 are controlled so as to cause their high-level periods to overlap with each other in part, and this control is repeated so that a high-voltage charge is stored in the main capacitor 23. Accordingly, a charging charge is stored in a continuous manner to the main capacitor 23 from the battery 1 serving as the electrical power source. Subsequently, when the potential of the main capacitor 23 rises to a certain voltage, e.g., 330V, a signal is provided from the voltage detecting circuit 20 to the camera control circuit (not shown) via the connection terminal "b". Then, the camera control circuit stops supplying the high-level signals to the connection terminals "d" and "e", to bring the step-up switching elements 31 and 34 into a non-conducting state, thus stopping the oscillating operation of the oscillation transformers 30 and 33. Thus, charging to the main capacitor 23 is completed.

Subsequently, when a flash emission signal is provided from the camera control circuit (not shown) via the connection terminal "c" in accordance with the photo-taking operation, a high-voltage pulse of several kV is applied to the trigger electrode 22*a* of the discharge tube 22 from the trigger circuit 21, so that the discharge tube is excited by this high-voltage pulse. Then, the charged charge of the main capacitor 23 is discharged so as to cause the discharge tube 22 to emit flash light, thus illuminating an object to be photographed.

Figure 3:
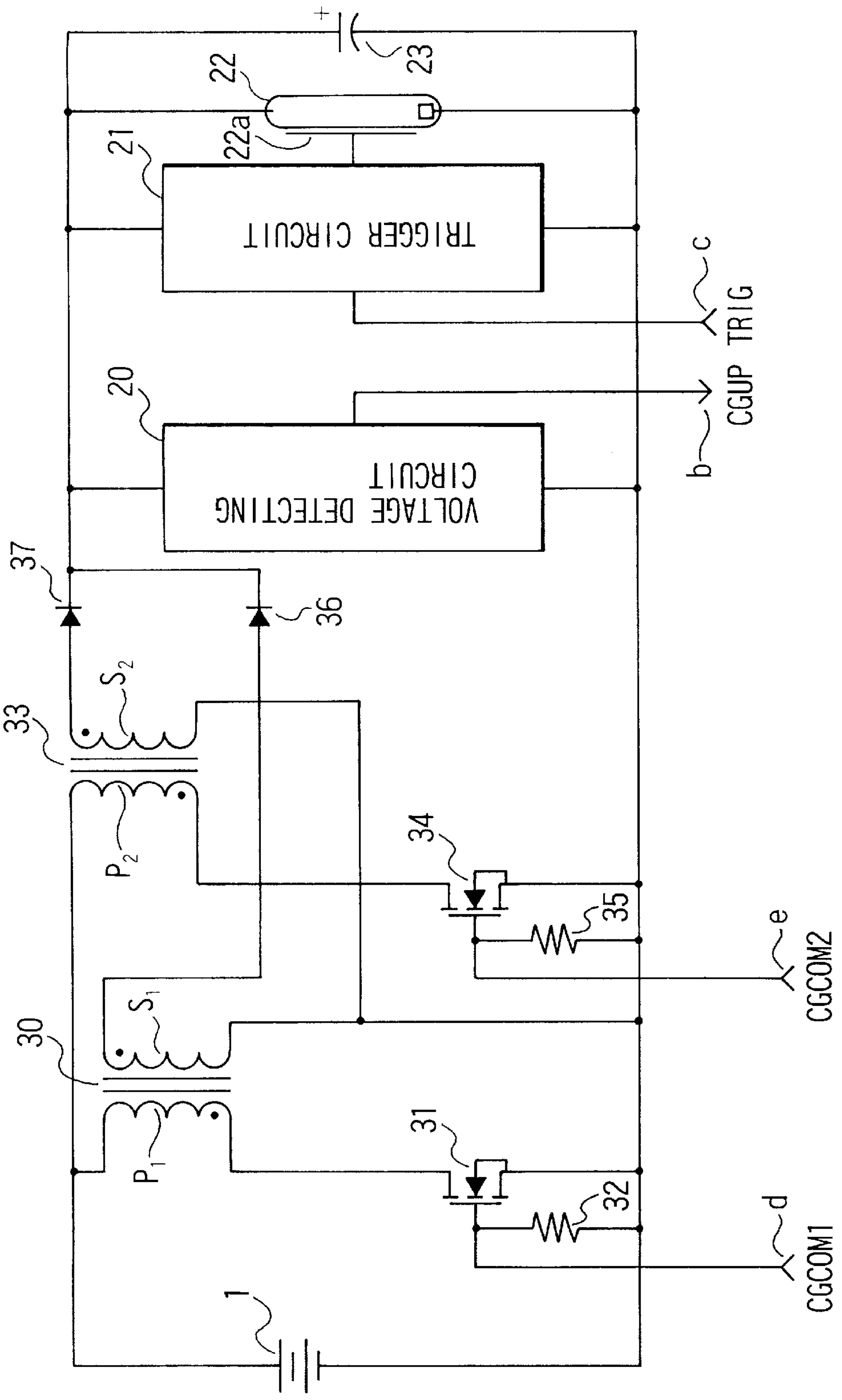
FIG. 3 is a circuit block diagram illustrating a second embodiment of the invention.

A second embodiment of the invention is illustrated in FIG. 3. The construction shown in FIG. 3 is approximately the same as that shown in FIG. 1, with the only difference being in the polarity of the oscillation transformers 30 and 33. While the DC—DC converter shown in FIG. 1 is a forward converter of separately-excited type, the DC—DC converter shown in FIG. 3 is a flyback converter of separately-excited type. Control signals to be supplied to the step-up switching elements 31 and 34 are the same as the pulse waveforms shown in FIG. 2.

Making simple description of the operation, the control signal CGCOM1 to be supplied to the step-up switching element 31 shown in FIG. 2 is provided via the connection terminal "d". Accordingly, a current flows through the primary winding $P_1$ of the oscillation transformer 30. This current causes an electromotive force to be generated in the secondary winding $S_1$, but the current is interrupted by the diode 36, so that energy is stored in the core of the oscillation transformer 30. The pulse width of the high-level pulse of the control signal CGCOM1 is set to such a time width that the core of the oscillation transformer 30 is not magnetically saturated, and the so-called gapped core having a gap provided in the magnetic path of the casing may be used particularly for a transformer which tends to experience magnetic saturation, so as to extend the high-level period, reduce the frequency and reduce switching loss that occurs while switching between the conducting and non-conducting states of the step-up switching element.

Also, when the connection terminal "d" changes to a low level, the step-up switching element 31 comes into the non-conducting state, so that the energy stored in the core of the oscillation transformer 30 is discharged to the loop of the diode 36, the main capacitor 23 and the secondary winding $S_1$, and a charging charge is stored in the main capacitor 23. Before the step-up switching element 31 becomes non-conductive, the control electrode of the step-up switching element 34 is provided with the high-level pulse of the control signal CGCOM2 shown in FIG. 2 via the connection terminal "e", so that the switching element 34 becomes conductive.

Due to the switching element 34 becoming conductive, a current flows from the battery 1 which serves as the electrical power source, via the primary winding $P_2$ of the oscillation transformer 33. This current causes an electromotive force to be generated in the secondary winding $S_2$, but the current is interrupted by the diode 37, so that energy is stored in the core of the oscillation transformer 33. As described above, the pulse width of the control signal CGCOM2 is set such that the control signal CGCOM2 changes to a low level before the core magnetic flux is saturated. Then, the step-up switching element 34 comes into the non-conducting state, so that the energy stored in the core is discharged to the loop of the diode 37, the main capacitor 23 and the secondary winding $S_2$, and is stored in the main capacitor 23.

The subsequent operations are the same as those of the first embodiment illustrated in FIG. 1, and thus the description thereof will be omitted here, but a current continuously flows from the battery 1, and thus charging of the main capacitor 23 is perpetually conducted, as in the first embodiment.

Although the above first and second embodiments have been illustrated as a parallel circuit of two DC—DC converters, it is needless to say that the invention encompasses the arrangements having three or more DC—DC converters. Also, the forms of the transformers need not be the same, rather, the duty of the control pulses may be different, as long as the control pulses overlap. Also, it is needless to say that substantial effects can be obtained by an arrangement wherein control operations of the step-up switching elements do not overlap but rather simultaneously switch over. The switching elements 31 and 34 may be transistors, FET transistors, or other switching elements or the like, so long as the control electrode thereof is capable of controlling conductivity and non-conductivity.

I claim:

1. An electronic flash device comprising:

a) a plurality of DC—DC converter circuits of separately-excited type each of which includes a switching element having a control electrode, and an oscillation transformer to which energization is controlled by said switching element, a control pulse signal being supplied to said control electrode;

b) a capacitor to be charged by said plurality of DC—DC converter circuits; and c) a discharge tube which converts charging energy charged to said capacitor into light energy, wherein said plurality of DC—DC converter circuits are connected in parallel.

2. An electronic flash device according to claim 1, wherein each of said plurality of DC—DC converter circuits is a forward converter.

3. An electronic flash device according to claim 1, wherein each of said plurality of DC—DC converter circuits is a flyback converter.

4. An electronic flash device according to claim 1, wherein the switching elements included in said plurality of DC—DC converter circuits simultaneously perform switching between a conducting state and a non-conducting state.

5. An electronic flash device according to claim 4, wherein each of said plurality of DC—DC converter circuits is a forward converter.

6. An electronic flash device according to claim 4, wherein each of said plurality of DC—DC converter circuits is a flyback converter.

7. An electronic flash device according to claim 4, wherein the switching elements included in said plurality of DC—DC converter circuits simultaneously perform switching between the conducting state and the non-conducting state in such a manner that at least one of the switching elements is in the conducting state.

8. An electronic flash device according to claim 7, wherein each of said plurality of DC—DC converter circuits is a forward converter.

9. An electronic flash device according to claim 7, wherein each of said plurality of DC—DC converter circuits is a flyback converter.

10. An electronic flash device according to claim 1, wherein when the switching elements included in said plurality of DC—DC converter circuits are switched between a conducting state and a non-conducting state, there is set a section of time at which the conducting states of the respective switching elements overlap with each other.

11. An electronic flash device according to claim 10, wherein each of said plurality of DC—DC converter circuits is a forward converter.

12. An electronic flash device according to claim 10, wherein each of said plurality of DC—DC converter circuits is a flyback converter.

13. An electronic flash device comprising:

a) a first DC—DC converter circuit of separately-excited type which includes a first switching element having a first control electrode, and a first oscillation transformer to which energization is controlled by said first switching element, a first control pulse signal being supplied to said first control electrode;

b) a second DC—DC converter circuit of separately-excited type which includes a second switching element having a second control electrode, and a second oscillation transformer to which energization is controlled by said second switching element, a second control pulse signal being supplied to said second control electrode;

c) a capacitor to be charged by said first DC—DC converter circuit and said second DC—DC converter circuit; and d) a discharge tube which converts charging energy charged to said capacitor into light energy, wherein said first DC—DC converter circuit and said second DC—DC converter circuit are connected in parallel, and wherein said first and second control pulses are supplied such that said second control electrode changes from a non-energizing state to an energizing state before said first control electrode changes from an energizing state to a non-energizing state.

14. An electronic flash device according to claim 13, wherein each of said first and second DC—DC converter circuits is a forward converter.

15. An electronic flash device according to claim 13, wherein each of said first and second DC—DC converter circuits is a flyback converter.

16. An electronic flash device comprising:

a) a first DC—DC converter circuit of separately-excited type which includes a first switching element having a first control electrode, and a first oscillation transformer to which energization is controlled by said first switching element, a first control pulse signal being supplied to said first control electrode;

b) a second DC—DC converter circuit of separately-excited type which includes a second switching element having a second control electrode, and a second oscillation transformer to which energization is controlled by said second switching element, a second control pulse signal being supplied to said second control electrode;

c) a capacitor to be charged by said first DC—DC converter circuit and said second DC—DC converter circuit; and d) a discharge tube which converts charging energy charged to said capacitor into light energy, wherein said first DC—DC converter circuit and said second DC—DC converter circuit are connected in parallel, and wherein said first and second control pulses are supplied such that said second control electrode changes from a non-energizing state to an energizing state at the same time that said first control electrode changes from an energizing state to a non-energizing state.

17. An electronic flash device according to claim 16, wherein each of said first and second DC—DC converter circuits is a forward converter.

18. An electronic flash device according to claim 16, wherein each of said first and second DC—DC converter circuits is a flyback converter.

* * * * *